(12) United States Patent
Freker

(10) Patent No.: US 6,564,335 B1
(45) Date of Patent: May 13, 2003

(54) CROSS CHIP TRANSFER MECHANISM FOR A MEMORY REPEATER CHIP IN A DRAM MEMORY SYSTEM

(75) Inventor: David E. Freker, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/540,318

(22) Filed: Mar. 31, 2000

(51) Int. Cl.$^7$ .............................. G06F 1/04; G06F 13/00
(52) U.S. Cl. ....................................................... 713/600
(58) Field of Search ................................ 713/400, 600; 710/58, 60, 61; 711/167

(56) References Cited

U.S. PATENT DOCUMENTS

| | | | | |
|---|---|---|---|---|
| 5,838,932 A | * | 11/1998 | Alzien | 710/314 |
| 6,157,238 A | * | 12/2000 | Na et al. | 327/297 |
| 6,182,254 B1 | * | 1/2001 | Bae | 714/718 |

* cited by examiner

*Primary Examiner*—Thomas M. Heckler
(74) *Attorney, Agent, or Firm*—Blakely, Sokoloff, Taylor & Zafman LLP

(57) ABSTRACT

According to one embodiment, a method of transferring data across a semiconductor chip comprises transmitting data from a first Rambus asic cell to a second Rambus asic cell using clock pulses generated at a first clock generator and sampling the data at the second Rambus asic cell using clock pulses generated at a second clock generator.

24 Claims, 5 Drawing Sheets

CROSS CHIP TRANSFER MECHANISM FOR A MEMORY REPEATER CHIP IN A DRAM MEMORY SYSTEM

FIELD OF THE INVENTION

The present invention relates to memory systems; more particularly, the present invention relates to transferring data across a memory repeater chip in a Rambus memory subsystem.

BACKGROUND

A Rambus Dynamic RAM (RDRAM) developed by Rambus, Inc., of Mountain View, Calif., is a type of memory that permits data transfer operations at speeds up to 1.2–1.6 gigabytes per second. RDRAM devices are typically housed in Rambus in-line memory modules (RIMMs) that are coupled to one or more Rambus channels. Typically, the expansion channels couple each RDRAM device to a memory controller. The memory controller enables other devices, such as a Central Processing Unit (CPU), to access the RDRAMs.

RDRAM based memory subsystems may include repeaters coupled to the expansion channel that monitor the expansion channel for activity and repeat the activity on one or more of the stick channels coupled thereto. FIG. 5 is a block diagram of an exemplary repeater. The repeater includes a slave Rambus Asic Cell (RAC) and two master RACs. The slave RAC is coupled to the expansion channel, while the master RACs are each coupled to a stick channel. The RACs are used to interface with the high frequency expansion or stick channels. Typically, a plurality of RDRAM devices are coupled to each of the stick channels.

The slave RAC operates various portions of its logic on one of three clocks (e.g., a slave receive clock and two slave transmit clocks). The master RACs also operate their logic using three different clocks (e.g., a master receive clock and two master transmit clocks). In the described mechanism, the receive clocks in the slave RAC and master RACs are synchronized via a phase locked-loop (PLL) in order to transfer data within the repeater at speeds up to 400 Mhz. Whenever commands and data is to be written to an RDRAM on one of the stick channels, the data must be transmitted from the expansion channel through the slave RAC and across the repeater chip to a master RAC. The slave RAC receives commands and data with the slave receive clock and uses the slave receive clock to transmit the commands and data across the chip to the particular master RAC.

A problem exists, however, in sampling the command and data signals at a master RAC at such a high speed. Considering clock jitters and phase errors, sampling the signals reliably in a master RAC with the master receive clock is often difficult because the lack of sufficient hold times. For instance, hold time violations would imply that delay must be added to the signal path. However, adding the requisite time delay to fix the hold time problem could potentially cause a setup time violation. Taking into consideration the problems stated above and the long cross chip distance for data transfer, it would be desirable to provide a mechanism for providing cross chip transfers at high speeds of communication.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but explanation and understanding only.

DETAILED DESCRIPTION

A mechanism for providing cross chip transfers at high speeds of communication is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Figure 1:
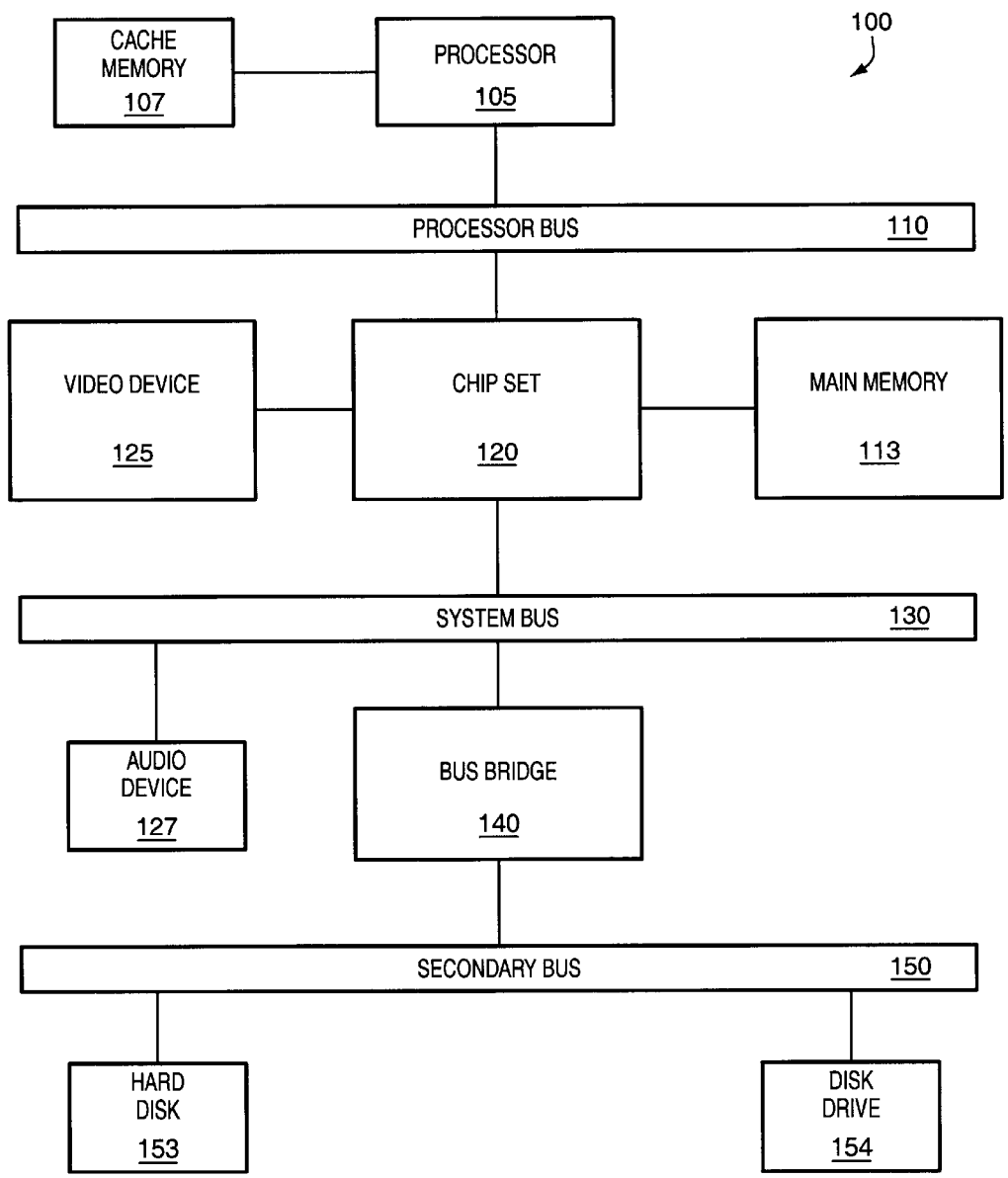
FIG. 1 is a block diagram of one embodiment of a computer system.

FIG. 1 is a block diagram of one embodiment of a computer system 100. Computer system 100 includes a central processing unit (processor) 105 coupled to processor bus 110. In one embodiment, processor 105 is a processor in the Pentium® family of processors including the Pentium® II family and mobile Pentium® and Pentium® II processors available from Intel Corporation of Santa Clara, Calif. Alternatively, other processors may be used. Processor 105 may include a first level (L1) cache memory (not shown in FIG. 1).

In one embodiment, processor 105 is also coupled to cache memory 107, which is a second level (L2) cache memory, via dedicated cache bus 102. The L1 and L2 cache memories can also be integrated into a single device. Alternatively, cache memory 107 may be coupled to processor 105 by a shared bus. Cache memory 107 is optional and is not required for computer system 100.

Chip set 120 is also coupled to processor bus 110. In one embodiment, chip set 120 is the 440BX chip set available from Intel Corporation; however, other chip sets can also be used. Chip set 120 may include a memory controller for controlling a main memory 113. Further, chip set 120 may be coupled to a video device 125 that handles video data requests to access main memory 113. In one embodiment, video device 125 includes a video monitor such as a cathode ray tube (CRT) or liquid crystal display (LCD) and necessary support circuitry.

Main memory 113 is coupled to processor bus 110 through chip set 120. Main memory 113 and cache memory 107 store sequences of instructions that are executed by processor 105. In one embodiment, main memory 113 includes a Rambus dynamic random access memory (RDRAM) system; however, main memory 113 may have other configurations. The sequences of instructions executed by processor 105 may be retrieved from main memory 113, cache memory 107, or any other storage device. Additional devices may also be coupled to processor bus 110, such as multiple processors and/or multiple main memory devices. Computer system 100 is described in terms of a single processor; however, multiple processors can be coupled to processor bus 110.

Processor bus 110 is coupled to system bus 130 by chip set 120. In one embodiment, system bus 130 is a Peripheral Component Interconnect (PCI) bus adhering to a Specification Revision 2.1 bus developed by the PCI Special Interest Group of Portland, Oreg.; however, other bus standards may also be used. Multiple devices, such as audio device 127, may be coupled to system bus 130.

Bus bridge 140 couples system bus 130 to secondary bus 150. In one embodiment, secondary bus 150 is an Industry Standard Architecture (ISA) Specification Revision 1.0a bus developed by International Business Machines of Armonk, N.Y. However, other bus standards may also be used, for example Extended Industry Standard Architecture (EISA) Specification Revision 3.12 developed by Compaq Computer, et al. Multiple devices, such as hard disk 153 and disk drive 154 may be coupled to secondary bus 150. Other devices, such as cursor control devices (not shown in FIG. 1), may be coupled to secondary bus 150.

Figure 2:
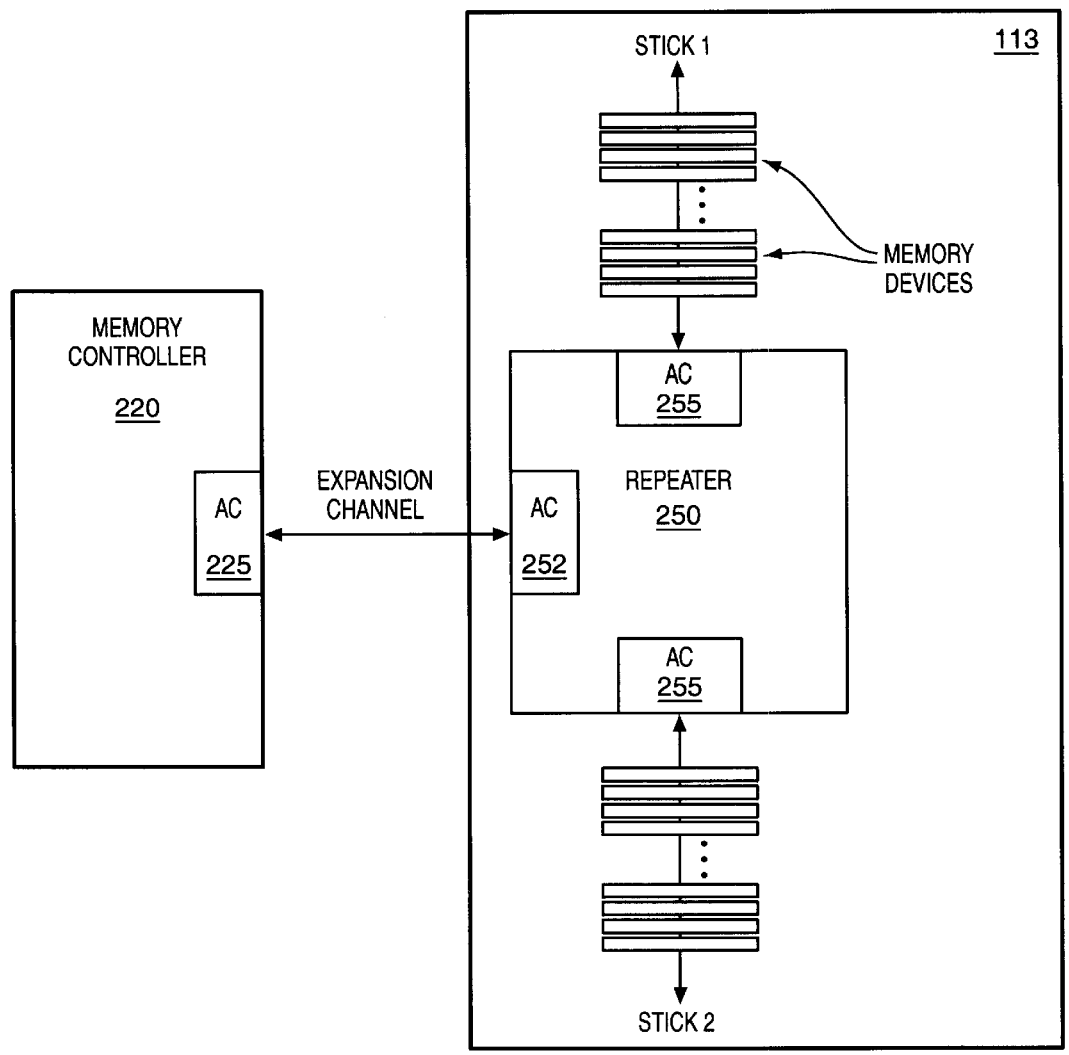
FIG. 2 is a block diagram of one embodiment of a memory controller coupled to a main memory device via a repeater.

FIG. 2 is a block diagram of one embodiment of a memory controller 220 coupled to main memory 113. Memory controller 220 includes a Rambus Asic Cell (RAC) 225. RAC 225 is used to interface to a high frequency expansion channel. The expansion channel may be driven at 400 Mhz, and transfer data on the rising and falling edge of an expansion channel clock. According to one embodiment, RAC 225 is implemented as a Rambus Asic cell (RRAC).

Main memory 113 includes repeater 250 coupled to memory controller 220 via the expansion channel. Repeater 250 is coupled to two stick channels (Stick 1 and Stick 2). Repeater 250 monitors the expansion channel for activity from memory controller 220 and repeats the activity on one or more of the stick channels. The stick channels coupled to repeater 250 function as an extension of the expansion channel. According to one embodiment, each stick channel includes 32 DRAM (or memory) devices that are included within one or more memory modules. Alternatively, each stick channel may include other quantities of DRAM devices. Ordinarily, a maximum of 32 memory devices may be directly coupled to the expansion channel. Therefore, the stick channels coupled to repeater 250 permit up to 128 memory devices to be accessed by memory controller 220.

In addition, repeater 250 may include two master RACs 255 and one slave RAC 252. As described above with respect to RAC 225, RAC 252 interfaces logic within repeater 250 with the expansion channel, while RACs 255 are used to interface the logic within repeater 250 to the stick channels. RACs 255 transmit and receive clock signals that have a fixed relationship between a receive clock and a transmit clock. Meanwhile, for RAC 252 there is no relationship the received clock signals and transmit clock signals.

Figure 3:
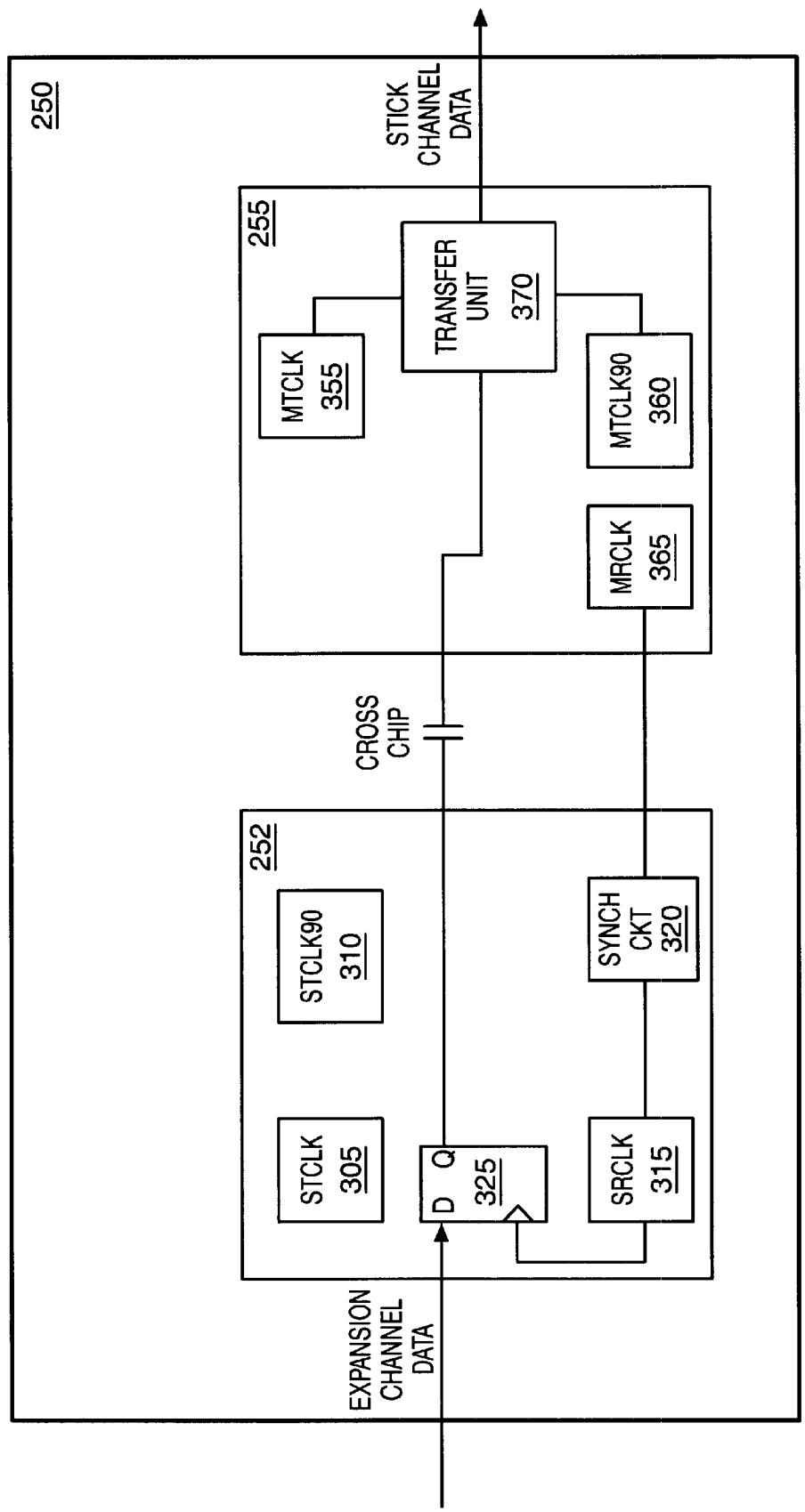
FIG. 3 is a block diagram of one embodiment of a repeater.

FIG. 3 is a block diagram of one embodiment of a repeater 250 with a cross chip communication mechanism. As discussed above, repeater 250 includes slave RAC coupled to a master RAC 255. Slave RAC 252 includes two slave transmit clock generators (STCLK 305 and STCLK90 310), a slave receive clock generator (SRCLK) 315, a synchronization circuit 320 and a latch 325. Master RAC 255 includes two master transmit clock generators (MTCLK 355 and MTCLK90 360), a master receive clock generator (MRCLK) 365 and a transfer unit 370. STCLK generator 305 and MTCLK generator 355 generate STCLK and MTCLK clock pulses, respectively. STCLK and MTCLK are used to transmit command and data signals from repeater 250. STCLK is used to drive signals received from master RACs 255 out to the expansion channel, while MTCLK is used to drive signals received from slave RAC 252 out to the attached stick channel.

STCLK90 generator 310 and MTCLK90 generator 360 generate STCLK90 and MTCLK90 clock pulses, respectively. STCLK90 and MTCLK90 are used to generate transmit clocks for transmission of data. According to one embodiment, STCLK90 leads SRCLK and MTCLK90 leads MRCLK by ninety degrees (90°) (e.g., ¼ clock cycle). In addition, STCLK leads STCLK90 and MTCLK leads MTCLK90 by an output buffer delay. SRCLK generator 315 and MRCLK generator 365 generate SRCLK and MRCLK clock pulses, respectively. SRCLK and MRCLK are used to sample command and data signals received at repeater 250 from the expansion channel and stick channel, respectively. For example, SRCLK is used to sample signals at slave RAC 252 from the expansion channel.

Further, SRCLK is used to transmit the signals from RAC 252 to master RAC 255 across repeater 250. According to a further embodiment the clock generators described above are implemented using a delay-locked loop (DLL). However, one of ordinary skill in the art will appreciate that one or more of the clocks may be,generated using other devices, such as phased-locked loops (PLL).

Synchronization circuit 320 synchronizes SRCLK with MRCLK. According to one embodiment, synchronization circuit 320 is implemented using a phased-locked loop (PLL). However, one of ordinary skill in the art will appreciate that other devices, such as a delaylocked loop (DLL) may used to implement synchronization circuit 320. Flip-flop 325 samples data received at slave RAC 252 from the expansion channel. According to one embodiment, flip-flop 325 is a D-flip-flop. However, in other embodiments, other types of flip-flops may be used.

Transfer unit 370 is coupled to slave RAC 252 and receives MTCLK and MTCLK90. Transfer unit 370 is used to receive signals from slave RAC 252 for transmission out to the attached stick channel. According to one embodiment, whenever command and data signals are to be written to a memory device on the stick channel, the signals are transmitted from the expansion channel through slave RAC 252 and across the repeater 250 chip to master RAC 255. The transfer of data between slave RAC 252 and master RAC 255 is carried out using the same operating frequency as the expansion channel. As described above, slave RAC 252 receives the signals and transmits the signals across repeater to a master RAC 255 using SRCLK. The signals are subsequently received at transfer unit 370 using MTCLK90 and transmitted to the stick channel using MTCLK.

Figure 4:
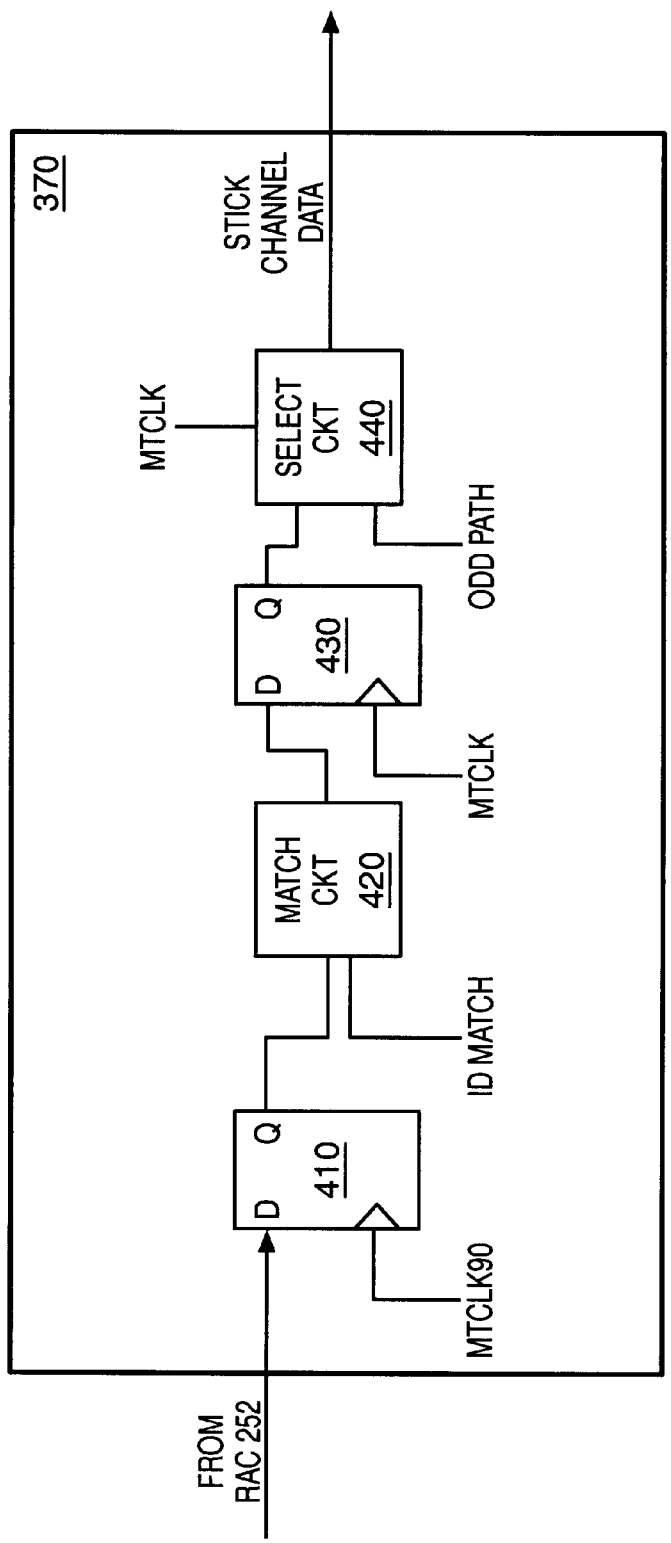
FIG. 4 is a block diagram of one embodiment of a transfer unit.
Figure 5:
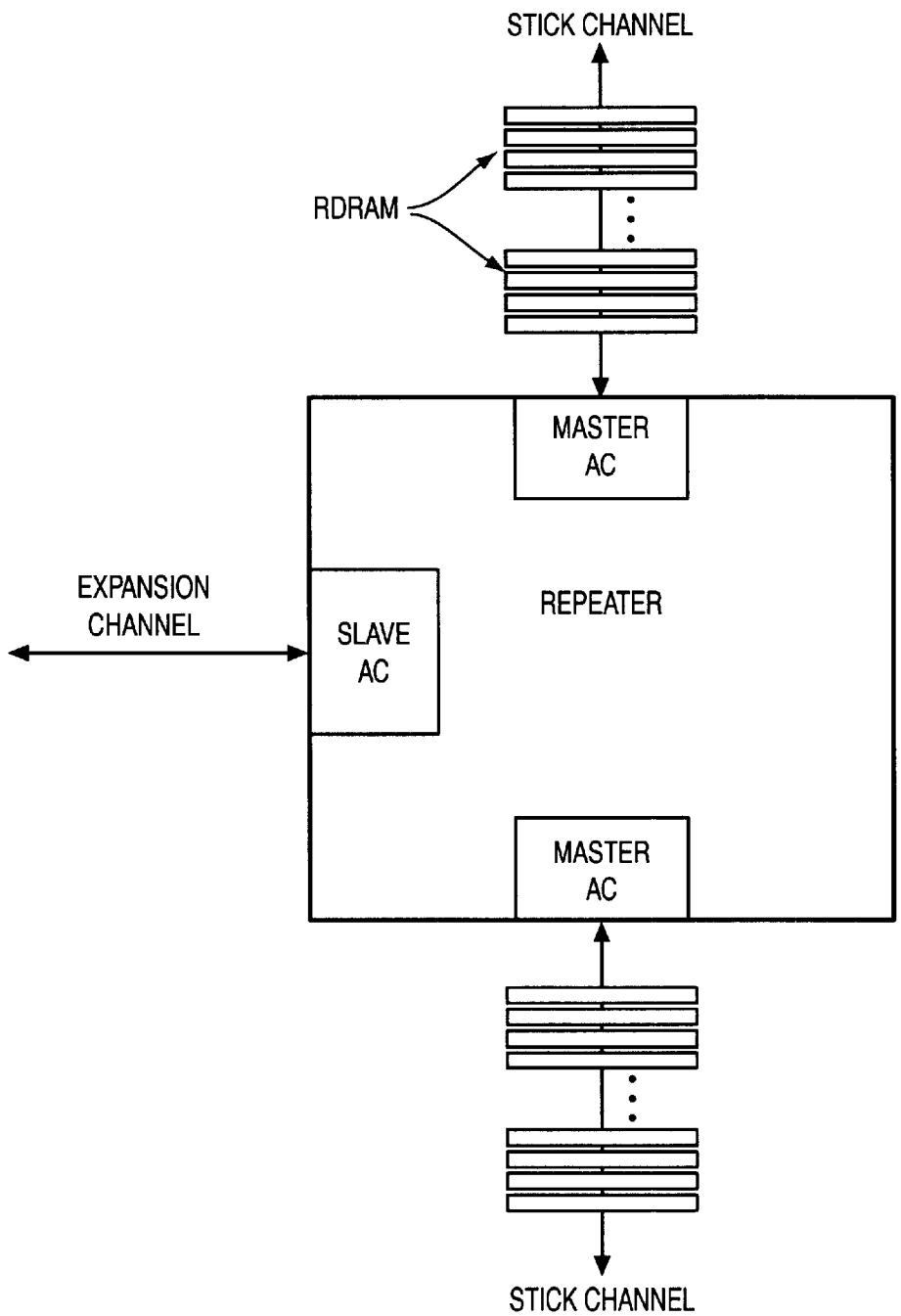
FIG. 5 is a block diagram of an exemplary repeater.

FIG. 4 is a block diagram of one embodiment of a transfer unit 370. Transfer unit 370 includes latches 410 and 430, a match circuit 420 and a select circuit 440. Latch 410 receives command and data signals from slave RAC 252. According to one embodiment, the signals received from slave RAC 252 at latch 410 are sampled using MTCLK90. As described above, MTCLK90 leads and MRCLK by one-fourth (¼) of a clock cycle. Thus a sufficient hold time (of approximately ¼ of a clock) is provided in order to sample the signals received from slave RAC 252. According to one embodiment, data transmitted between slave RAC 252 and transfer unit 370 takes approximately three-fourths (¾) of a clock cycle to propagate across repeater 250. Therefore, sufficient setup time is also provided.

Match circuit 420 is coupled to and receives data from flip-flop 410. Match circuit 420 is used to determine which RAC 255 is to transmit (or repeat) the packet. According to one embodiment, since there are two stick channels per repeater, one of the two match circuits 420 will indicate a match. According to one embodiment, match circuit 420 is a decoder. Latch 430 is coupled to match circuit 420 and receives the signals to be transmitted from master RAC 255. According to one embodiment, the signals received at latch 430 are sampled using MTCLK in order to re-time the data to be transmitted to the attached stick channel.

According to one embodiment, latches 410 and 430 are D-latches. However, one of ordinary skill in the art will appreciate that other types of latches may be used. Select circuit 440 is coupled to latch 430 and receives command and data signals that are to be transmitted to the stick channel. Select circuit 440 selects between the command and data signals and an odd path signal. In one embodiment, data is transferred on rising and falling edges of a channel clock. In such an embodiment, the falling edges are referred to as the even clock and the rising edges are referred to as the odd clock. However, one of ordinary skill in the art will appreciate that such references may be reversed.

According to one embodiment, the command and data signals are selected on the falling edge the MTCLK, while the odd path signals are selected on the rising edge. Nevertheless, it will be appreciated that select circuit 440 may operate according to different select signals. Further, select circuit 440 may be implemented using a multiplexer. Although transfer unit 370 has been described as including match circuit 420 and select circuit 440, one of ordinary skill in the art will appreciate that these devices may be excluded from transfer unit 370 without altering the scope of the invention.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

Thus, a mechanism for providing cross chip transfers at high speeds of communication has been described.

What is claimed is:

1. A computer system comprising:
   a memory controller; and
   a memory device coupled to the memory controller, wherein the memory device includes a repeater that transmits a first set of signals received at a first Rambus asic cell using a first clock source and receives the first set of signals at a second Rambus asic cell using a second clock source.

2. The computer system of claim 1 wherein the first set of signals is received at the first Rambus asic cell from the memory controller via an expansion channel coupled between the first Rambus asic cell and the memory controller.

3. The computer system of claim 2 wherein the first set of signals is received at the first Rambus asic cell using the first clock source.

4. The computer system of claim 1 wherein the first set of signals is transmitted from the second Rambus asic cell to a first stick channel using a third clock source.

5. The computer system of claim 4 wherein clock signals generated by the second clock source is one-half of a cycle ahead of clock signals generated by the first clock source and clock signals generated by the third clock source is one-fourth of a cycle ahead of clock signals generated by the second clock source.

6. The computer system of claim 4 wherein the second Rambus asic cell comprises:
   the second clock source;
   the third clock source; and
   a transfer unit.

7. The computer system of claim 6 wherein the transfer unit comprises;
   a flip-flop; and
   a first latch coupled between the flip-flop and the first stick channel.

8. The computer system of claim 7 wherein the first Rambus asic cell comprises:
   the first clock source; and
   a second latch coupled between the expansion channel and the flip-flop.

9. The computer system of claim 1 wherein the memory device is a rambus dynamic random access memory.

10. A memory system comprising a repeater, wherein the repeater transmits a first set of signals received at a first Rambus asic cell using clock pulses generated at a first clock generator and receives the first set of signals at a second Rambus asic cell using clock pulses generated at a second clock generator.

11. The memory system of claim 10 wherein the first set of signals is received at the first Rambus asic cell from an expansion channel coupled to the first Rambus asic cell using the clock pulses generated at the first clock generator.

12. The memory system of claim 10 further comprising a first stick channel, wherein the first set of signals is transmitted from the second Rambus asic cell to the first stick channel using clock pulses generated at a third clock generator.

13. The memory system of claim 12 wherein clock pulses generated by the second clock generator is one-half of a cycle ahead of clock pulses generated by the first clock generator and clock pulses generated by the third clock generator is one-fourth of a cycle ahead of clock pulses generated by the second clock generator.

14. The computer system of claim 12 wherein the second Rambus asic cell comprises:
   the second clock generator;
   the third clock generator; and
   a transfer unit.

15. The computer system of claim 14 wherein the transfer unit comprises;
   a flip-flop; and
   a latch coupled between the flip-flop and the first stick channel.

16. The computer system of claim 10 wherein the memory system is a Rambus dynamic random access memory.

17. A rambus repeater comprising:
   a first Rambus asic cell; and
   a second Rambus asic cell coupled to the first Rambus asic cell wherein the first Rambus asic cell uses clock pulses generated at a first clock generator to receive a first set of signals and the second Rambus asic cell uses clock pulses generated at a second clock generator to receive the first set of signals.

18. The repeater of claim 17 further, wherein the first set of signals is transmitted from the second Rambus asic cell to a first stick channel using clock pulses generated at a third clock generator.

19. The repeater of claim 18 wherein clock pulses generated by the second clock generator is one-fourth of a cycle ahead of clock pulses generated by the first clock generator and clock pulses generated by the third clock generator is one-fourth of a cycle ahead of clock pulses generated by the second clock generator.

20. The computer system of claim 18 wherein the second Rambus asic cell comprises:

the second clock generator;

the third clock generator; and a transfer unit.

21. The computer system of claim 20 wherein the transfer unit comprises;

a flip-flop; and a latch coupled between the flip-flop and the first stick channel.

22. A method of transferring data across a memory system comprising:

transmitting data from a first Rambus asic cell to a second Rambus asic cell using clock pulses generated at a first clock generator; and sampling the data at the second Rambus asic cell using clock pulses generated at a second clock generator.

23. The method of claim 22 further comprising sampling the data at the first Rambus asic cell from an expansion channel using clock pulses generated at the first clock generator.

24. The method of claim 22 further comprising transmitting the data from the second Rambus asic cell to a stick channel using clock pulses generated at a third clock generator.

* * * * *

UNITED STATES PATENT AND TRADEMARK OFFICE
CERTIFICATE OF CORRECTION

PATENT NO. : 6,564,335 B1 Page 1 of 1
DATED : May 13, 2003
INVENTOR(S) : Freker

It is certified that error appears in the above-identified patent and that said Letters Patent is hereby corrected as shown below:

Column 2,
Line 3, before "explanation", insert -- are for --.

Signed and Sealed this

Second Day of December, 2003

JAMES E. ROGAN
*Director of the United States Patent and Trademark Office*